United States Patent [19]

Comerford et al.

[11] 4,446,358

[45] May 1, 1984

[54] PREHEATER FOR USE IN MASS SOLDERING APPARATUS

[75] Inventors: Matthias F. Comerford, Newton Highlands, Mass.; Michael G. McCallan, Windham, N.H.

[73] Assignee: Cooper Industries, Inc., Houston, Tex.

[21] Appl. No.: 330,909

[22] Filed: Dec. 15, 1981

[51] Int. Cl.³ .................. F27B 9/06; F27D 11/00; B23K 1/20

[52] U.S. Cl. ..................... 219/388; 219/339; 219/405; 219/483; 228/10; 228/232; 432/230

[58] Field of Search ............ 228/180 R, 10, 232; 219/388, 216, 339, 483, 405; 432/230; 355/3 FU

[56] References Cited

U.S. PATENT DOCUMENTS

| | | | |
|---|---|---|---|
| 1,802,407 | 4/1931 | Danninger | 219/388 |
| 3,122,117 | 2/1964 | Marzullo | 228/10 |
| 3,219,794 | 11/1965 | Mindell | 219/388 |
| 3,445,626 | 5/1969 | Michaels | 219/388 |
| 3,610,508 | 10/1971 | Laubmeyer | 228/102 |
| 4,286,509 | 9/1981 | Miller | 219/388 |
| 4,354,095 | 10/1982 | de Vries | 432/230 |

FOREIGN PATENT DOCUMENTS 54-126547 10/1979 Japan .................. 355/3 FU
56-163074 12/1981 Japan .................. 228/10

*Primary Examiner*—B. A. Reynolds
*Assistant Examiner*—Teresa J. Walberg
*Attorney, Agent, or Firm*—Hayes, Davis & Soloway

[57] ABSTRACT

An improved preheater for use in mass soldering apparatus employing a bank of quartz lamp heaters mounted in parabolic reflectors and including switching means for switching the quartz heaters on and off in response to the presence of a circuit board on a conveyor passing through the preheater.

6 Claims, 3 Drawing Figures

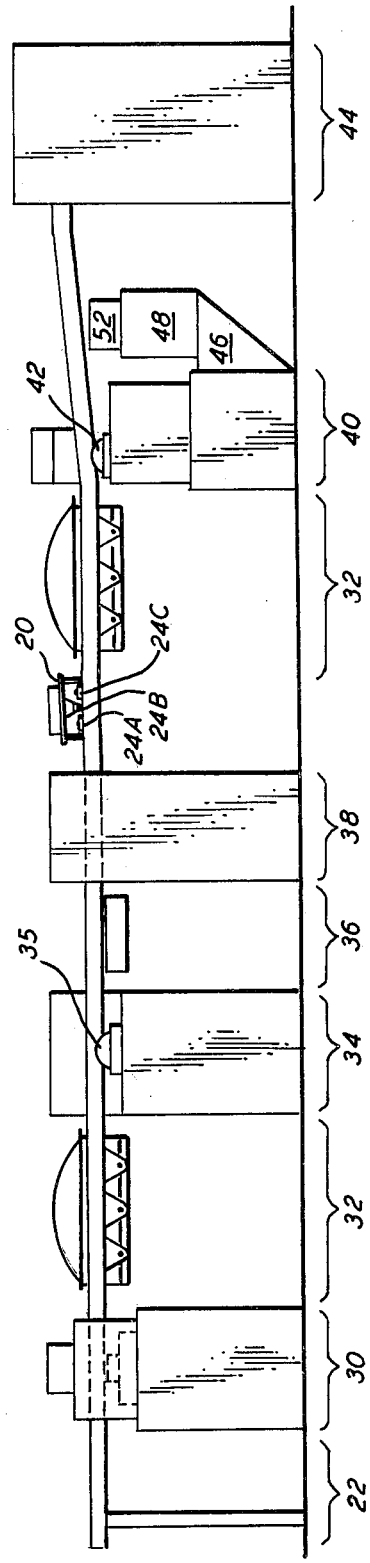
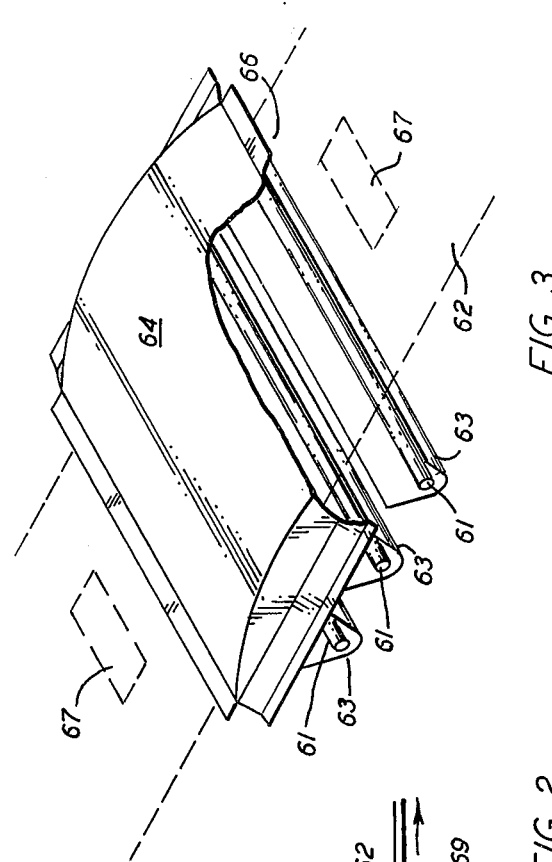
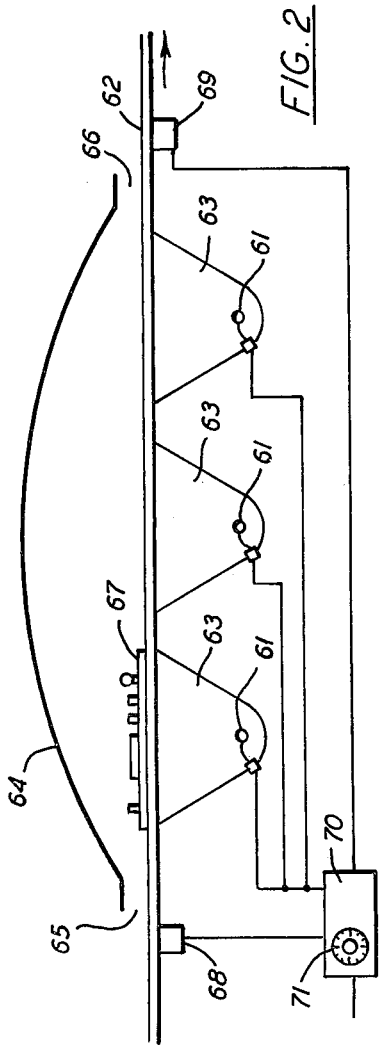

PREHEATER FOR USE IN MASS SOLDERING APPARATUS

This invention relates to an improved preheater for use in mass soldering apparatus and, in particular, though not exclusively, to a preheater using quartz lamp heaters.

Typically in the mass soldering of components to circuit boards, the components are first loaded onto the board and a flux (in a liquid carrier) is then applied to the board. Typically the flux carrier comprises an organic solvent such as a lower alcohol. Thereafter the board is preheated at a preheating station prior to mass soldering. The circuit boards are transported through the flux stations, preheating station and soldering station on a conveyor, spaced apart from one another often with a transit time of many seconds between each board. Preheating drives off the flux carriers so as to eliminate the possibility of splattering, which can produce pin or blow holes, in the subsequent soldering step. Preheating also activates the flux and thus chemical cleaning of the metallic areas of the board and, finally, preheating conditions the board so as to minimize the effects of thermal shock in the subsequent soldering step. In the prior art preheating has generally been accomplished by the use of hot plates comprising infrared heaters, infrared heating lamps, or the like, and may also include hot air blowers. While the prior art has proposed preheaters in a modular arrangement so that selected preheaters may be used as dictated by the size of the printed circuit board being processed (U.S. Pat. No. 3,604,611) no prior art design includes the switching of preheaters on and off according to the presence of the circuit board at a preheater station. Such an arrangement has heretofore been impractical as the prior art infrared preheaters could not be effectively switched on and off between boards due to their inherent substantial heat-up time requirement of one or more minutes.

The examples of the prior art may be found in U.S. Pat. Nos. 3,465,116; 3,604,611; 3,610,508; 3,659,770; 3,797,100; 3,908,886; and 4,180,199. U.S. Pat. No. 4,180,999 discloses a preheater for a mass soldering system in which the heat and dwell time of the preheating step is controlled. However, there is no teaching in this reference of switching the preheaters on only when a board is present at the preheating station and the arrangement disclosed would be unsuitable for such a mode of operation due to the heat-up time (in excess of a minute or two) before the heater can be predictably utilized.

Of the other patents listed 3,465,116 teaches switching heating elements on and off in the soldering operation; however, the switching is for the purpose of maintaining a desired soldering temperature and not to avoid the use of heaters in the absence of a printed circuit board at the preheating station. U.S. Pat. No. 3,610,508 also discloses switching heating means on and off for adjusting temperature at the point of soldering and U.S. Pat. Nos. 3,659,770 and 3,797,100 contain similar disclosures. The patents listed are listed to provide technical background and are not regarded as pertinent to the inventive concept of the present invention.

It is an object of the present invention to provide a preheater, for use in mass soldering apparatus, the heat-up time of the heaters of which is sufficiently short to enable the heaters to be turned on only in the presence of a circuit board to be preheated at the preheating station, thereby to avoid the high energy wastage inherent in prior art preheaters the heat-up time of the heaters of which would not permit such switching.

According to the present invention there is provided a preheater for a mass soldering apparatus comprising at least one rapid heat-up heater, a parabolic reflector for directing the output from the heater toward a printed circuit board conveyor path and a detector responsive to a circuit board entering the preheater to turn on said at least one heater.

The invention will now be described, by way of example, with reference to the accompanying drawings, in which:

FIG. 1 is a side elevation diagramatically illustrating an integrated mass soldering system in which a preheater according to the present invention is utilized;

FIG. 2 is a diagrammatic representation of a preheater according to the present invention; and FIG. 3 is a partially cut-away diagrammatic perspective view of the preheater shown in FIG. 2.

A typical automatic wave soldering and processing system is diagramatically illustrated in FIG. 1. The illustrated system comprises an integrated mass soldering system of the type available commercially from Hollis Engineering, Inc. of Nashua, N.H. The processing system includes an assembly station 22 in which the circuit boards 20 are loaded with electrical and electronic components 24A, 24B, 24C at predetermined positions on the board. The circuit boards are of conventional construction, and for the purposes of illustration boards 20 comprise two-sided circuit boards with plated-through holes. The components, which also are of conventional type may be inserted in the board by any method known in the art which may include manual assembly, semi-automatic, or automatic assembly which may comprise single station or multiple-station pantagraph or numerically controlled machines all of which are well known in the art and need not be further described. It will be noted that at this stage components 24A, 24B, 24C are loosely mounted in the circuit board 20 with their leads 26 depending through holes 28 in the board.

The board and loosely mounted components are then passed to a flux station 30 where a flux is applied onto the bottom of the board and the component depending leads. The flux may be any flux well known in the art and may include, for example, a water-white rosin flux, an activated rosin flux or a water-soluble flux.

The fluxed board is then passed to a preheating station 32 where the board is heated from the bottom to a top side temperature of about 110° C. to activate the flux and drive off the bulk of the flux solvent. The preheated board is then passed to a so-called "STABILIZER BASE" 34 wherein the board bottom surface and depending component leads are passed in contact with the upper end of a standing wave of molten wax 35. The board is then passed to a cooling station 36 where the waxed board is cooled sufficiently to solidify the wax and thereby lock the components in position relative to the board according to the so-called "STABILIZER PROCESS" (the terms "STABILIZER", STABILIZER BASE" and "STABILIZER PROCESS" all are trademarks of Hollis Engineering, Inc., of Nashua, N.H.) The cooled board is then passed to a lead cutting station 38 wherein the component leads are trimmed to finished length.

The board is then passed to a wave soldering station 40 wherein the board bottom surface and depending component leads are passed in contact with the upper end 42 of a standing wave of molten solder. The solder melts and displaces the wax from the board and leads, heats the printed board and leads, drives flux further into plated through holes 28, and substantially simultaneously wets metallic areas on the bottom of the board, plated through holes, and the lower ends of the component leads. Following soldering the board is passed to an automatic cleaning and drying station 44 where flux residues, etc. are removed from the board. The entire system is interconnected by a conveyor system of known type which is adapted to carry the circuit board being soldered from assembly station 22 through fluxing station 30, preheating stations 32, before stabilizer base 34 and before wave soldering station 40, STABILIZER BASE 34, cooler 36, lead cutter 38, wave soldering station 40 and cleaning and drying station 44. As seen in FIG. 1, the transporting assembly is inclined at a slight angle relative to the horizontal, e.g. about 7°, for passing through wave soldering station 40. The transportation assembly is mechanically coupled through a drive shaft (not shown) to a main power transmission 46. The entire system is controlled from console 48.

With reference to FIGS. 2 and 3, three tubular quartz heater lamps 61 are disposed horizontally under the printed circuit board conveyor 62 of an automatic mass soldering system at a preheating station 32 as described with reference to FIG. 1.

The lamps 61 are each located on the horizontal focal axis of three parabolic upwardly facing reflector 63, the three reflectors 63 being disposed in parallel closely spaced relationship closely adjacent the underside of the conveyor 62. Disposed above the conveyor is a part cylindrical reflector 64 which overlies the entire area occupied by the three parabolic reflectors 63. The axis of the cylindrical part of reflector 62 is parallel to the focal axes of the parabolic reflectors 63. The reflector 64 is spaced above the conveyor to provide an entrance slot 65 and an exit slot 66 for circuit boards 67 passing through the preheater on conveyor 62. A circuit board entrance detector 68 is located adjacent entry slot 65 to detect the presence of a circuit board 67, on conveyor 62, about to enter the preheater by way of the entry slot 65. A circuit board exit detector is disposed adjacent exit slot 66 to detect a circuit board as it exits from the preheater by way of the exit slot 66. The detectors 68 and 69, which may be microswitches arranged to change their conductive state upon physical contact with a circuit board, are connected to a lamp switching circuit 70 to supply operating current, from an electrical power supply, to the lamps 61 when a circuit board 67 is detected at the entrance 65 and to turn off that supply of operating current when the circuit board 67 is detected by detector 69 as having exited from exit 66. While detector 68 is arranged to activate the lamps 61 when a circuit board is first detected at the entrance, the detector 69 causes the lamps to be turned off only when a circuit board 67 has completely passed from exit 66.

The switching circuit 70 includes means, for example an SCR voltage regulator, for varying the voltage of the electrical supply, thereby to control the heat output from the lamps. This voltage control means is set by manual control 71 together with the speed of the conveyor 62 in order that a circuit board 67 passing through the preheater leaves the preheater at a desired temperature.

It will be appreciated that the detectors 68 or 69 need not be switches requiring physical contact with the circuit board for their switching function and may be, for example, photoelectric cells, etc. It will also be appreciated that detector 69 might be eliminated entirely in favor of or supplemented by a timer included in the switching circuit 70 to control the on-time of lamps 61 to a desired transit time of a circuit board 67 or the last of a series of circuit boards 67 passing through the preheater as detected by detector 68.

It will also be appreciated that while the present invention is here described with respect to tubular quartz lamps, which reach approximately 90% of their maximum output in 0.5 seconds (e.g. General Electric Model QH 1600T3), the invention is not limited to the use of such lamps and that other forms of heater having a rapid heat-up time (i.e. reaching 90% of maximum output in 20 seconds or preferably 5 seconds or less) may be utilized.

We claim:

1. A preheater for a mass soldering apparatus comprising a plurality of rapid heat-up heaters, a parabolic reflector for directing the output from each heater toward a printed circuit board conveyor path and a detector responsive to a circuit board entering the preheater to turn on said heaters, the reflectors being directed to provide a substantially uniform distribution of heat from the heaters over a desired area of said circuit board conveyor path, said parabolic reflectors being arranged to direct heat from the heaters upwardly from underneath said circuit board conveyor path and a reflective cover being disposed over said desired area of the circuit board conveyor path to be heated, to reflect heat energy, passing through the conveyor path from the heaters, back toward the conveyor path, the heaters being quartz lamps of elongate cylindrical form disposed horizontally in parallel spaced relationship, the reflectors being disposed in parallel spaced apart relationship and said reflective cover defining a part cylindrical reflector having a longitudinal axis parallel to the cylindrical axis of said lamps, said quartz lamps having a response time to 90% of maximum heat of less than 5 seconds and further means arranged to detect or predict passage of a circuit board from the preheater and connected, in response to such passage, to turn off said heaters.

2. A preheater according to claim 1 comprising a control circuit responsive to the detector to operate said heaters at a desired intensity, said control circuit including means for manually adjusting the intensity of said heater.

3. A preheater according to claim 1 including a control circuit responsive to the detector to turn on said heaters, said control circuit including timer means to maintain said heater on whenever a circuit board is passing along said conveyor path through the preheater.

4. A preheater according to claim 1 wherein said detector detects the presence of a circuit board at the entry to the preheater by physical contact therewith.

5. A preheater according to claim 1 when the detector is a remote detector adapted to detect the presence of a circuit board at the entry to the preheater without physical contact therewith.

6. A mass soldering apparatus comprising a wave soldering station and a preheater for bringing a printed circuit board up to a desired temperature, said preheater for a mass soldering apparatus comprising a plurality of rapid heat-up heaters, a parabolic reflector for directing the output from each heater toward a printed circuit board conveyor path and a detector responsive to a circuit board entering the preheater to turn on said heaters, the reflectors being directed to provide a substantially uniform distribution of heat from the heaters over a desired area of said circuit board conveyor path, said parabolic reflectors being arranged to direct heat from the heaters upwardly from underneath said circuit board conveyor path and a reflective cover being disposed over said desired area of the circuit board conveyor path to be heated, to reflect heat energy, passing through the conveyor path from the heaters, back toward the conveyor path, the heaters being quartz lamps of elongate cylindrical form disposed horizontally in parallel spaced relationship, the reflectors being disposed in parallel spaced apart relationship and said reflective cover defining a part cylindrical reflector having a longitudinal axis parallel to the cylindrical axis of said lamps, said quartz lamps having a response time to 90% of maximum heat of less than 5 seconds and further means arranged to detect or predict passage of a circuit board from the preheater and connected, in response to such passage, to turn off said heaters.

* * * * *

UNITED STATES PATENT AND TRADEMARK OFFICE
CERTIFICATE OF CORRECTION

PATENT NO. : 4,446,358
DATED : May 1, 1984
INVENTOR(S) : Matthias F. COMERFORD and Michael G. McCALLAN It is certified that error appears in the above-identified patent and that said Letters Patent are hereby corrected as shown below:

Claim 5, line 1, the term "when" should be "wherein".

Signed and Sealed this

Eleventh Day of June 1985

[SEAL]

Attest:

DONALD J. QUIGG

Attesting Officer

Acting Commissioner of Patents and Trademarks